(No Model.) 5 Sheets—Sheet 1.

S. L. CHAPMAN.
APPARATUS FOR MOLDING PULP.

No. 488,517. Patented Dec. 20, 1892.

Witnesses:
J. B. Weir.
Louis M. F. Whitehead.

Inventor:-
Stanley L. Chapman.
By Dayton, Poole & Brown
His Attorneys (No Model.)

S. L. CHAPMAN.
APPARATUS FOR MOLDING PULP.

No. 488,517.

Patented Dec. 20, 1892.

Witnesses
J. B. Weir.
Louis M. T. Whitehead.

Inventor:—
Stanley L. Chapman.
by:— Dayton, Poole & Brown
his Attorneys

(No Model.) 5 Sheets—Sheet 3.

S. L. CHAPMAN.
APPARATUS FOR MOLDING PULP.

No. 488,517. Patented Dec. 20, 1892.

Witnesses:—
J. B. Weir.
Louis M. T. Whitehead.

Inventor:—
Stanley L. Chapman.
by:— Dayton, Poole & Brown
his Attorneys (No Model.) 5 Sheets—Sheet 4.

S. L. CHAPMAN.
APPARATUS FOR MOLDING PULP.

No. 488,517. Patented Dec. 20, 1892.

Witnesses:
J. B. Weir
Louis M. F. Whitehead

Inventor:
Stanley L. Chapman.
by Dayton, Poole & Brown
his Attorneys

THE NORRIS PETERS CO., PHOTO-LITHO., WASHINGTON, D. C.

(No Model.) 5 Sheets—Sheet 5.

S. L. CHAPMAN.
APPARATUS FOR MOLDING PULP.

No. 488,517. Patented Dec. 20, 1892.

Witnesses:
J. B. Weir.
Louis M. T. Whitehead.

Inventor:—
Stanley L. Chapman.
by— Dayton, Poole + Brown
his Attorneys.

UNITED STATES PATENT OFFICE.

STANLEY L. CHAPMAN, OF EVANSTON, ILLINOIS.

APPARATUS FOR MOLDING PULP.

SPECIFICATION forming part of Letters Patent No. 488,517, dated December 20, 1892.

Application filed October 6, 1891. Serial No. 407,860. (No model.)

*To all whom it may concern:*

Be it known that I, STANLEY L. CHAPMAN, of Evanston, in the county of Cook and State of Illinois, have invented certain new and useful Improvements in Apparatus for Molding Pulp; and I do hereby declare that the following is a full, clear, and exact description thereof, reference being had to the accompanying drawings, and to the letters of reference marked thereon, which form a part of this specification This invention relates to improvements in machines and apparatus for the manufacture from paper pulp or fiber of pails and other articles or vessels having flat or nearly flat bottoms and conical or inclined side walls, and in which the bottom and side walls are made integral or in one piece with each other.

The invention relates more especially to apparatus employed for molding the pulp or giving it the general form of the article to be made preparatory to the pressing or compression of the molded article to give it the desired solidity or hardness and its final form.

One of the principal difficulties arising in the molding of pails and similar articles, is to secure a uniform distribution of the paper pulp from which the article is molded within the mold, so that the pulp will be deposited with substantially equal density throughout the side walls as well as the bottom of the molded article.

In a machine or apparatus embodying my invention, the mold in which the pulp is inserted and which gives shape to the article, consists of the following parts, to-wit: an inner form having conical sides and an approximately flat end wall acting to give shape respectively to the inner surfaces of the side walls and the bottom of the vessel; an outer conical inclosure or jacket parallel or approximately parallel with the inner wall or form of the mold, and adapted to give shape to the outer surfaces of the conical part of the vessel; a cylindric extension forming a continuation of the said inclosure or jacket, and constituting a pulp receptacle; a plunger sliding in the same, the inner surface of which gives form to the flat bottom of the article to be molded and which may be advanced to compress the pulp within the mold, or, in other words, to squeeze and separate water therefrom in the act of molding the article; other inner and outer parallel walls forming extensions of the inner form and outer inclosure or jacket at the larger end of the mold and constituting a cylindric pulp receptacle or auxiliary space additional to or forming an extension of the cylindric part of the mold; and an annular plunger fitting and sliding between said walls and operating to force or compress the pulp into or within the said annular part of the mold.

The several parts or walls forming the mold are provided with suitable apertures or perforations to allow the escape of water from the pulp in the process of molding the article, provision being made specially for the escape of water at the lower part of the mold in order that the separation of the water from the pulp may be aided by gravity as far as possible, it being of course understood that the pulp is introduced into the mold in the form of fibers suspended in a relatively large quantity of water so as to form a fluid mass which may be easily delivered through pipes to the interior of the mold and which will easily and readily flow to all parts of the same. I prefer to arrange the mold with the smaller ends of the conical inner and outer parts upwardly and to deliver the pulp at the top of the mold beneath the plunger therein, and when the mold is thus arranged ample spaces or perforations for the escape of water at the lower part of the mold will be provided in the inner and outer parallel walls between which the annular plunger acts, the effect of the presence of such openings or apertures at this point being to facilitate the flowing of the liquid pulp downwardly through the conical part of the mold, thereby insuring an ample supply of fiber in the space afforded by said inner and outer walls below the mold proper and above the annular plunger referred to. In the operation of the mold thus made, a measured quantity of pulp sufficient to form the article is introduced into the top of the mold and the plunger at the top of the mold is then forced downward against the top of the inner conical form while the annular plunger at the bottom of the mold is lifted through the annular space in which it works until it reaches the lower margins of the inner and outer conical parts which form the mold proper. The pulp is thus squeezed or compressed by both plungers, the upper plunger compressing the pulp and squeezing the water therefrom at the upper part of the mold in a manner to form the bottom of the vessel and to force or compress a part of the pulp toward the conical part of the mold while the lower annular plunger forces or compresses the pulp endwise into the lower conical part of the mold thereby insuring the compression of the pulp to a practically equal extent in all parts of the mold, or, in other words, giving the molded article equal density or solidity of texture throughout. After the article is molded, as above stated, it is removed from the mold and if necessary subjected to pressure by the use of a separate pressing device which gives final form to the article. Such device may be made in any one of the several forms heretofore used for this purpose, and forms no part of the present invention. It is preferred in practice, however, to employ in the device used for the final pressing, the same inner form as is employed in the molding machine so that the molded article need not be removed from such inner form in transferring it from the molding machine to the pressing apparatus. For this purpose the apparatus embodying my invention is preferably provided with an inner form which is made of sufficient strength to withstand the action of the pressing device and is made removable from the mold in such manner that it may easily be transferred to the pressing apparatus. To allow of such removal of the inner form, I preferably make the same separable from the inner ring or annulus which forms the downward extension thereof and the inner wall of the auxiliary pulp holding space, and I make the outer conical inclosure or jacket separate from the outer annulus or ring which forms the outer wall of said auxiliary annular space or chamber while said conical inclosure or jacket and the parts above the same are removable upwardly to a point considerably above the top of the inner form. When the mold is thus constructed, after the molding of the article has been completed, the mold is opened by lifting the outer conical part or jacket together with the cylindric extension attached thereto and the plunger in the latter, until the inclosure or jacket is above and free from the molded article which then rests upon the inner form, and the inner form is then removed to the pressing machine, another inner form being substituted for the one removed in case it is desired to proceed with the molding of another article before the one already molded is pressed and removed from the form on which it was molded.

The machine herein shown shows a mold constructed and operating in the manner above set forth, together with devices for giving motion to the parts of the mold, means for delivering the pulp to the interior of the mold, for removing the inner form together with the molded article thereon, and other devices tending to render automatic or facilitate the operation of the molding apparatus, as will hereinafter fully appear.

In the accompanying drawings illustrating my invention.

As shown in the said drawings the parts of the apparatus forming the mold proper, are constructed as follows:

A indicates an inner form which gives shape to the inner surface of the molded article and which consists of the conical side wall $a$ and end wall $a'$, both of which walls are apertured or perforated to allow the escape of water from the pulp. Commonly the form will be covered by a correspondingly shaped layer or covering of finely perforated sheet metal or fine wire gauze and the outer surfaces of the walls $a\ a'$ will be provided with grooves or channels leading to the perforations thereof and serving to freely conduct to said perforations the water escaping through the said covering as heretofore common in similar machines. The walls $a\ a'$ of the inner form are conveniently supported by disks $a^2\ a^3$ which are rigidly connected with a strong central post $a^4$ giving the necessary strength to the form to withstand the action of the pressing devices.

B is a conical open ended inclosure or jacket which surrounds the form A to give shape to the outer surface of the vessel to be molded, and said inner form A and jacket B are arranged with their smaller ends upward so that the larger part or open end of the vessel is at the bottom of the mold.

C indicates an open ended cylinder attached to the upper end of the jacket B and forming an extension thereof, said cylinder having its internal diameter equal to the smallest diameter of the inner surface of the jacket. Said cylinder C is herein shown as attached to the jacket by means of ears or flanges $c'$ $b'$ on the adjacent ends of said parts through which are inserted bolts for securing the same together. Within the cylinder C is located a vertically sliding plunger D which fits closely within the cylinder and the lower surface of which is shaped to give the desired form to the bottom surface of the article.

Figures 2, 15:
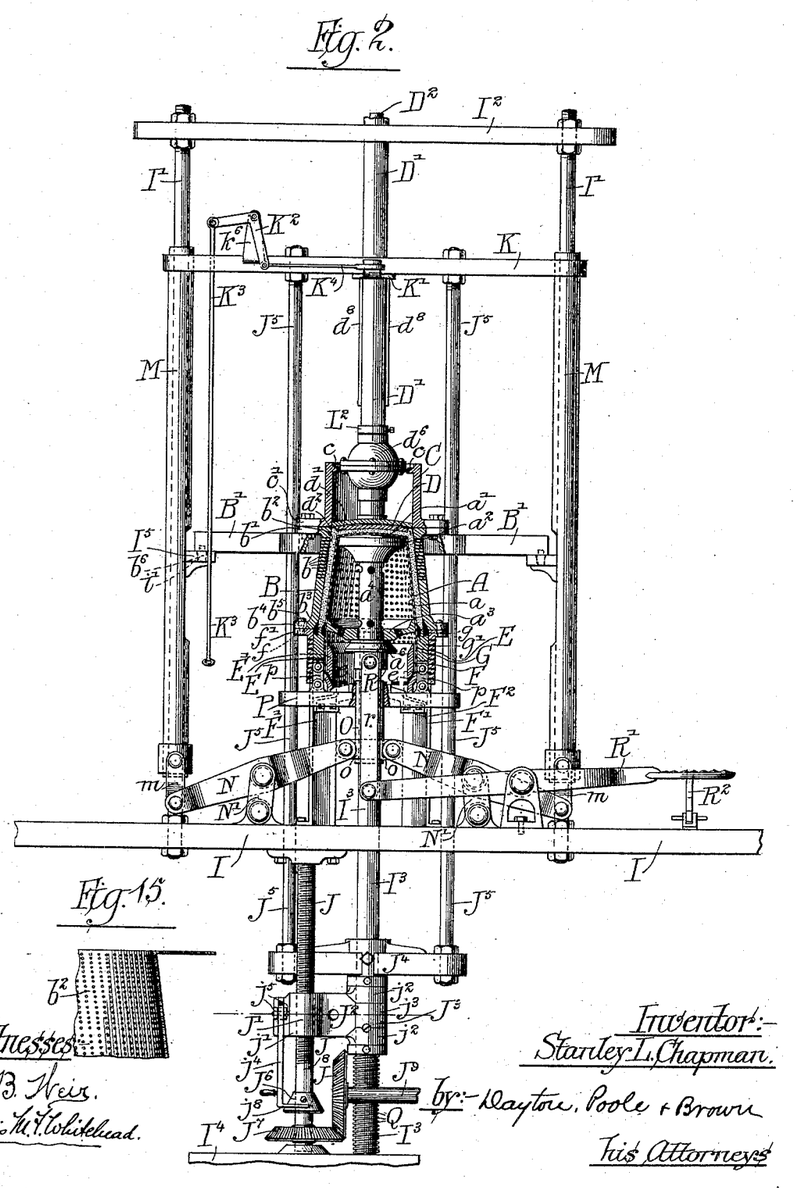
Fig. 2 is a similar view of the same showing parts of the mold in section and in a changed position.
Fig. 15 is a vertical detail section of a perforated lining of the mold shown in Fig. 1.
Figure 3:
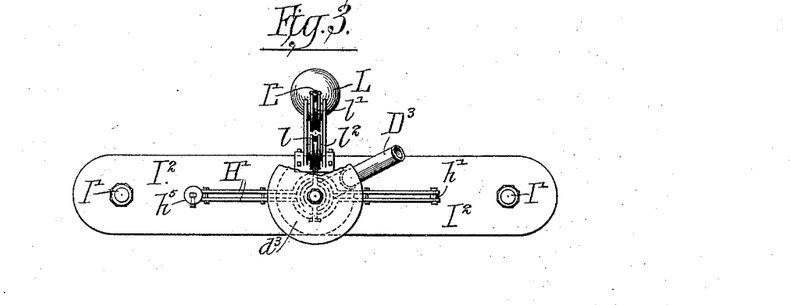
Fig. 3 is a partial top plan view of the machine.

The particular mold shown is adapted for forming a pail having a slightly convex bottom with a rim or chine around its margin, and for this purpose the end $a'$ of the inner form is made slightly convex and the inner or lower surface of the plunger D is made concave, while around the inner margin of the plunger is formed a channel or rabbet $d$ to give shape to the said flange or chine. The plunger D is sustained by attachment to a stem D′ which is herein shown as made hollow or tubular to afford a passage for the delivery of pulp to the mold. The jacket B cylinder C and plunger D are movable vertically so that the said parts may be lifted to free the jacket from the molded article and to allow the removal of the form A with the article thereon from the machine. The means employed for lifting the said parts and for giving them vertical movement will be hereinafter described. The jacket B is preferably provided within its side wall with perforations to allow the escape of water outwardly therethrough, such perforated part of the jacket being covered by a finely perforated ring $b^2$ of sheet metal (Fig. 15) held in position by a flange at its top which flange is held or clamped between the flanges of the said jacket B and cylinder C.

The construction of the pulp holding and compressing devices at the lower part of the mold will now be described. E. F. are inner and outer open ended rings or cylinders, of which the inner cylinder E forms the downward extension of the side walls $a$ of the inner form, while the cylinder F forms a downward extension of the outer wall or jacket B of the mold. Said cylinders E and F together form an annular auxiliary pulp chamber or receptacle extending downward from the lower part of the mold proper and adapted to receive a supply of pulp when the mold is filled, sufficient for supplying any deficiency in the quantity of pulp which the mold proper is capable of receiving. Said cylinders E and F, are immovable and are sustained in position by suitable supports from the base of the machine, the inner cylinder E being preferably made of sheet metal and sustained upon an annular cast metal ring E′ while the outer cylinder F is made of cast metal and both of said cylinders are supported by rigid standards F′ attached to the outer cylinder F and provided with inwardly extending arms or brackets $F^2$, by which said ring is rigidly supported. The bottom of the annular space or chamber formed between the cylinders E and F is formed by a sliding ring or annular plunger G, which ring or plunger is vertically movable between said cylinders E and F so that it may be lowered at the time the pulp is inserted into the mold, and lifted to force the pulp from the annular or auxiliary pulp chamber formed by said cylinders, into the space between the form A and the jacket B which constitute the mold proper. Both the inner and outer cylinders are perforated to allow the free escape of water therefrom, the perforations being preferably made numerous or close together to allow of the rapid escape of water from the pulp entering the said chamber, and thereby facilitate the flow of pulp downward into the space between the inner form A and jacket B. As preferably constructed, the inner wall E is provided with many perforations, and the supporting ring E′ with external channels communicating with passages or openings $e\ e$ by which water passing through the inner cylinder E is allowed to escape at the interior of the ring E′. The perforations in the outer cylinder F are preferably fewer in number and smaller at their inner than at their outer ends, the perforations in the inner cylinder being relied upon to afford escape for the greater part of the water from the pulp. The space between the cylinders E and F may be of the same width as that between the inner form and the outer jacket, but as herein shown as a preferable construction, said cylinders E and F are located farther apart than said inner form and outer jacket, so that the auxiliary pulp receptacle is considerably wider than the side portions of the mold proper. The annular piston or plunger G, is of course, made to fit closely between the said cylinders E and F so that as said piston rises, it will lift the pulp within the said auxiliary chamber and force the same into the mold proper. The object of making the auxiliary receptacle formed by the cylinders E and F, larger or wider than the adjacent parts of the mold proper, is to afford an abundant supply of pulp without necessitating the giving of the piston an inconveniently long or extended movement or stroke, it being obvious that by placing the cylinders E and F at a suitable distance apart, a quantity of pulp sufficient for the purpose, may be held between them, even when the stroke of the piston is very short, or when it stands when depressed, only a short distance below the lower edge of the mold proper.

Figures 8, 9, 10, 11, 12:
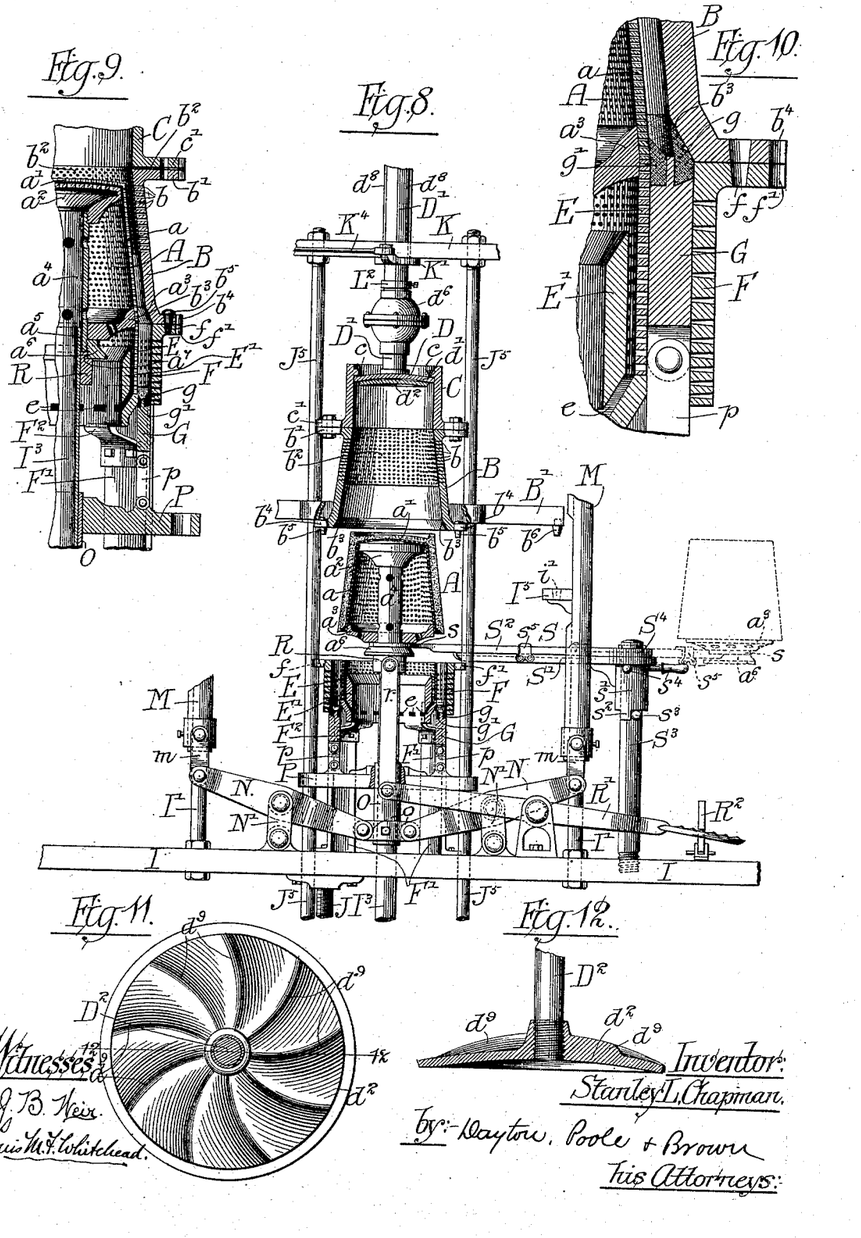
Fig. 8 is a vertical section of the mold showing the parts thereof in still another position.
Fig. 9 is an enlarged detail sectional view of a part of the mold.
Fig. 10 is a similar view, much enlarged, showing a changed position of the parts.
Fig. 11 is a detail plan view of the lower movable part of the plunger removed from the machine.
Fig. 12 is a sectional view thereof, taken on line 12—12 of Fig. 11.

At the junction of the jacket B and the outer cylinder F, the annular pulp space instead of being abruptly narrowed is preferably narrowed by means of a conical or beveled surface $b^3$ at the lower margin of the jacket B and in connection with this feature, a special construction is provided in the annular piston which forms a separate feature of invention. This feature is as follows: Around the outer margin of the annular piston G is placed a packing ring $g$ (Figs. 9 and 10) of rubber or other flexible material, which packing ring is attached to the piston in any suitable manner and rests or bears against the outer cylinder F. Said packing ring $g$ extends above or beyond the end surface of the piston and is inclined or beveled to a sharp or acute edge, and it operates in the same manner as that kind of a packing known as a "cup leather," to form a tight or close joint between the piston and the cylinder by being pressed outwardly against the cylinder by the pressure of the pulp against the inner surface of the ring. Said packing ring serves the further purpose of filling the space formed by the beveled or inclined surface $b^3$ when the piston reaches the upper limit of its movement, that is to say, the packing ring is beveled to approximately the same angle as that formed between the inner surface of the jacket B and the beveled surface $b^3$, so that when the ring reaches the said beveled surface its free edge will be thrown or drawn inwardly by the said beveled surface, and when it rests in contact with, or opposite said beveled surface it fills the triangular space formed by said beveled surface and the inner surface of the packing and forms a continuation of the inner surface of said jacket. The operation of the packing in this respect, is clearly shown in the detail view Fig. 10. The said ring $g$ is shown as circumferentially grooved, to facilitate the inward bending of the free edge, but this construction is not essential. In connection with the outer packing ring $g$ thus constructed, is employed a similar inner ring $g'$. This ring is tapered or beveled generally in the same manner as the ring $g$, and bears against the inner cylinder as the annular piston is moved. The pressure of the pulp against said ring forces the free edge of the same toward or against the said inner cylinder, thus making a tight joint therewith during the movement of the piston, in the same manner as before described in connection with the said ring $g$. In this instance however, the said ring $g'$ retains its usual form when the piston reaches the upper limit of its movement, and the inner oblique surface of the packing gives form to the beveled inner edge of the vessel. Preferably the said inner surface of the packing $g'$ is concaved so as to give the usual convex or rounded finish at the edge of the vessel as usual in case of pails, tubs and similar articles.

Means for supplying pulp to the upper part of the mold are provided as follows: As hereinbefore stated, the plunger D which moves or slides within the cylinder C at the top of the mold, is supported by a tubular stem D' through which pulp is delivered to the mold. To afford access of the pulp to the mold and at the same time to provide for closing the inlet opening through which the pulp is introduced at the time of compressing the pulp, devices are provided as follows: The said plunger D is made in two parts, to-wit, an upper part or plate $d'$, and a lower or under part $d^2$, the upper plate being attached rigidly to the stem D', while the lower plate $d^2$ which forms the under or working surface of the plunger, is movable vertically toward and from the upper plate. Said plate $d^2$ is supported by attachment to a rod or stem $D^2$ which extends upwardly through the stem D' and is adapted to be moved endwise within the stem in such manner as to separate the lower plate $d^2$ of the plunger from the upper plate thereof and thereby afford an opening or the space between said plates, through which the pulp may be delivered to the mold, the stem $D^2$ being of course made considerably smaller in diameter than the interior diameter of the tubular stem D' so as to afford ample space for the passage of the pulp through the stem and from the lower end of the stem to the space between said plates. This construction obviously tends to secure a distribution of the pulp within the mold, inasmuch as by its use the pulp is delivered at the margin of the lower plate $d^2$ and in position to fall by gravity within the annular space at the sides of the mold. As a further means of securing thorough and even distribution of the pulp within the mold, the plate $d^2$ is given a rotary motion at the time of the delivery of the pulp, so that the pulp passing or flowing over the same will be thrown outwardly by centrifugal action and thereby distributed equally in all parts of the circumference of the mold. For giving such rotary motion to said plate $d^2$ the stem $D^2$ to which it is attached is extended upwardly above the upper end of the plunger stem D' and is provided on its upper end with a pulley $d^3$ around which a driving band may be passed for the purpose of giving rotary motion to the plate.

To facilitate the distribution of the pulp in the rotation of the plate, the latter is provided on its top surface with radial flanges $d^9$ $d^9$ (Figs. 11 and 12) preferably curved in the manner shown; the said plate being arranged to bear at its margin only against the top plate or body of the plunger, where the parts are accurately fitted to each other in order to make a tight joint to prevent the escape of pulp upwardly through the plunger during the pressing operation.

$D^3$ indicates the pulp supply tube or passage which is connected with the hollow plunger stem $D'$ at a point below its upper end, one of the bearings $d^4$ for said stem $D^2$ being located at the upper end of the tube. A second bearing $d^5$ (Fig. 19), is provided at the lower end of the stem $D'$ said bearing, in order to avoid interference with the downward flow of pulp through the stem and to afford convenient access to the bearing, being constructed and supported as follows: The said stem is provided with a spherical enlargement $d^6$ formed by means of two cast sections attached to the separated parts of the stem near its lower end and united to each other by flanges and bolts in the manner illustrated. The bearing $d^5$ is suspended within the center of the spherical enlargement $d^6$ by means of radial arms $d^7$ attached to or cast on the bearing and held in recesses or sockets formed at the joint between the sections of the spherical part $d^6$.

In order to hold the plate $d^2$ normally against or in contact with the upper or main part $d'$ of the plunger D, a suitable lifting spring $D^4$ is applied to the stem $D^2$, and in connection therewith is provided a connection by which the stem may be easily moved by hand against the action of the spring, so that the plate may be easily depressed by the operator at the time of delivery of pulp to the mold. The specific construction illustrated for this purpose, is as follows: H is a rigid cross-bar attached to the upper end of the stem $D'$ by means of a central collar or socket $h$ on the cross-bar, through which collar the upper end of the stem is inserted, and in which the same is secured. $H'$ is another cross-bar located above cross-bar H and connected with the same at one end, by means of a vertically arranged pivoted link $h'$. The pulley $d^3$ is provided with a hub by which it is attached to the stem $D^2$ and said hub rests within a bearing aperature formed in the said bar $H'$. Said hub furthermore is held from vertical movement relatively to said bar $H'$ by means of a pin or stud $h^2$ on the bar which enters a groove $h^3$ in the said hub. The spring $D^4$ heretofore referred to, is interposed between the bearing $d^4$, at the upper end of the tube $D^2$ and lower surface of the cross-bar $H'$ so that the said spring serves to lift the cross-bar, and with it the stem which is held from endwise movement relatively to the cross-bar, by means of the pin or stud $h^2$ heretofore referred to.

Figures 1, 13, 14:
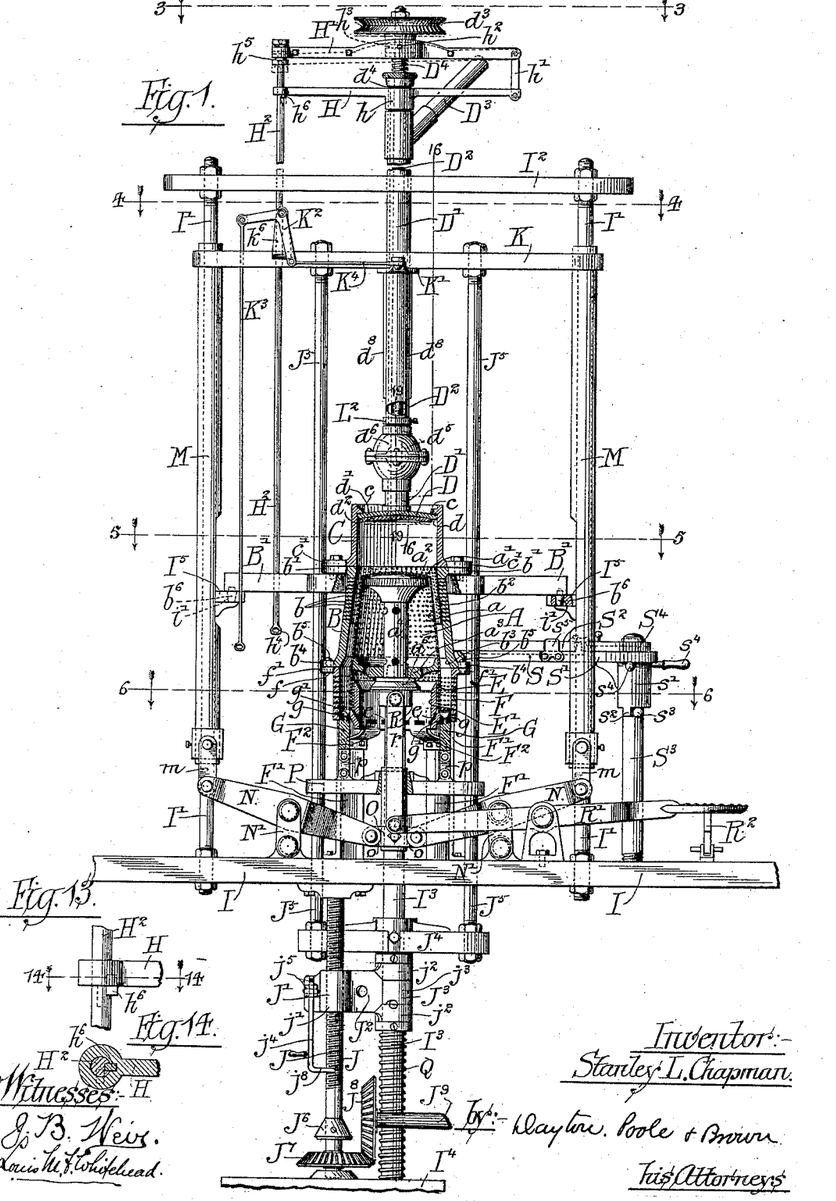
Figure 1 is a view in elevation of an apparatus embodying the same, the main parts of the mold being shown in section.
Fig. 13 is an enlarged detail view of a part shown in Fig. 1.
Fig. 14 is a sectional plan view taken on line 14—14 of Fig. 13.

$H^2$ is a vertically arranged rod connected at its upper end with the cross-bar $H'$ by means of a flexible connection, and extending downward to a point within reach of the operator, said bar being provided at its lower end, with a convenient loop or handle $h^4$. The said rod $H^2$ has rotatable connection with the cross-bar $H'$ as seen at $h^5$, passes through the cross-bar H and is provided with a lug $h^6$ adapted to pass vertically through a notch in the said cross-bar H (Fig. 14), when the rod is in one position, but which may be thrown into position to engage the lower surface by the turning of said rod when the latter is drawn down to bring the lug beneath said cross-bar and thereby prevent the rising of the upper cross-bar under the action of the spring $D^4$. This device affords a means of holding the plate $d^2$ in its downward position, during the time that the pulp is being delivered to the mold. The plunger D being, as hereinbefore described, vertically movable, for the purpose of compressing the pulp within the mold said stem $D'$ to which it is attached, is also vertically movable by means hereinbefore described. The several parts, which, as hereinbefore stated, are attached to the stem, are also vertically movable with the said stem, that is to say, the cross-bars H and $H'$, stem $D^2$ and pulley $d^3$, together with the hand rod $H^2$, are all moved vertically with the stem $D'$ when the latter is moved for the purpose of actuating the plunger, but the movement of the said plate $d^2$ in the manner described, is effected independently of the vertical movement of said stem $D'$ on which the actuating devices referred to are supported.

Having now described the construction of the parts constituting the mold proper, and also the devices for delivering the pulp to the mold, the means illustrated for actuating or moving the parts of the mold will now be described, premising, however, that in the construction shown both the upper plunger D and the lower annular plunger or piston G are moved or advanced within the mold to compress the pulp therein at the same time, so that the pulp is compressed simultaneously from the upper and lower ends of the mold toward the central part thereof.

The main frame of the machine on which the several working parts are supported consists generally of a horizontal base I, two vertical, parallel frame standards $I'$ $I'$ arranged at opposite sides of and equidistant from the central axis of the mold, and a horizontal frame piece or girt $I^2$ connecting the upper ends of said frame standards at a point considerably above the top of the mold, but below the upper end of the stem $D'$ which supports the plunger D. Said stem passes through a bearing aperture in the said frame girt $I^2$ and slides freely within the same.

$I^3$ is a stationary guide rod which is arranged vertically in axial alignment with the central axis of the mold, and reaches both above and below the frame base I, the lower end of said rod being preferably secured in a bed piece $I^4$. Said guide rod $I^3$ serves to support the inner form A and also as a guide for some of the working parts hereinafter described.

The means illustrated for giving movement to the plunger D and piston G consist of a stationary screw shaft J adapted for engagement with a split nut $J'$, which nut is given vertical movement by the screw and is connected by suitable intermediate mechanism with the said plunger and piston. Said shaft J is arranged parallel with the guide rod $I^3$ hereinbefore referred to, and the nut J' is secured to the end of an arm $J^2$ which is in turn attached to or formed upon a vertically sliding sleeve $J^3$, upon the guide rod $I^3$. Attached to the upper end of said sleeve $J^3$ is a cross head $J^4$, said cross head and sleeve being adapted to slide together up and down on the guide rod $I^3$. Attached to the ends of the cross head $J^4$ are two rods $J^5 J^5$ which extend upwardly at either side of the mold past the latter, and at a point at a considerable distance above the mold, but beneath the frame piece $I^2$ are secured to a cross head or yoke K. Said yoke is engaged at its ends with and slides upon the frame standards I' I' and is provided at its center with an aperture for the passage of the stem D'. Said yoke is adapted for engagement with the stem so as to transmit vertical movement to the latter when the yoke is moved, but is detachably engaged with said stem so that the latter may be lifted independently of the yoke under certain circumstances.

Figures 4, 5, 7:
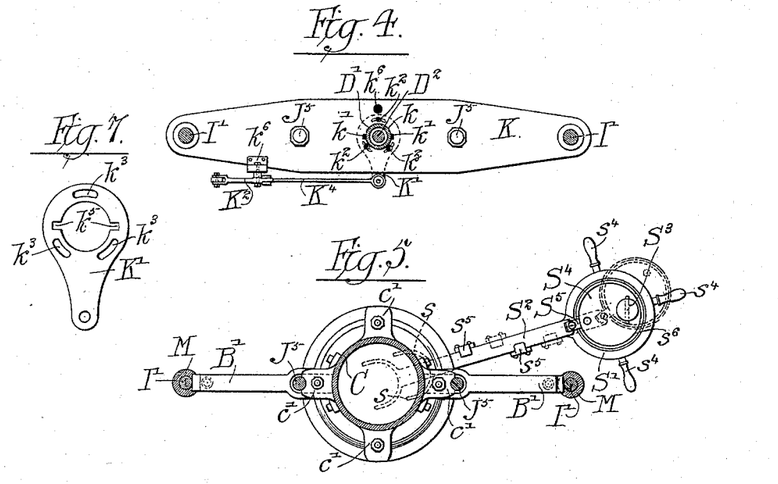
Fig. 4 is a horizontal sectional view taken upon line 4—4 of Fig. 1 and a partial plan view of the machine looking in the direction indicated by the arrows.
Fig. 5 is a similar section taken upon line 5—5 of Fig. 1 likewise showing a partial plan view of the machine, looking in the direction indicated by the arrows.
Fig. 7 is a detail plan view of a part shown in Fig. 4.
Figure 6:
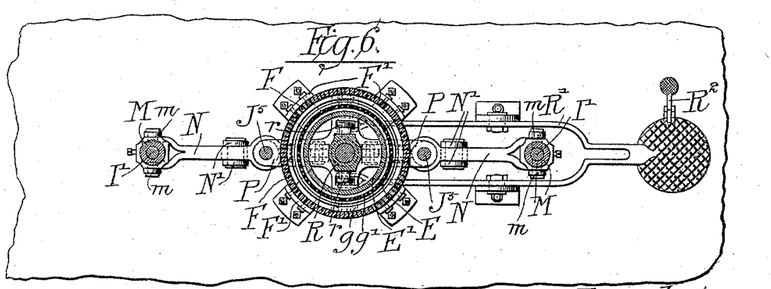
Fig. 6 is a similar section taken upon line 6—6 of Fig. 1 and a similar partial plan view of the machine.

The devices illustrated for detachably connecting the yoke with said stem, are made as follows: The said stem is provided in its part adjacent to the cross head, with two opposite splines or longitudinal flanges $d^8 d^8$, and the apertures $k$ of the yoke K, through which the stem passes, is provided with corresponding notches $k' k'$. (Fig. 4.) The said splines $d^8 d^8$ terminate at their upper ends at such a point upon the stem, that when the yoke K is elevated and the parts of the mold are in their working position with the plunger D at the upper part of its stroke within the cylinder C, said upper ends of the splines will come somewhat beneath the lower surface of the said yoke. K' Fig. 7 is a locking plate provided with an opening through which the stem D' passes, and mounted upon the said yoke so as to rotate about an axis concentric with the said stem.

The means of mounting the plate K herein shown, consists of three bolts $k^2 k^2 k^2$ secured in the yoke K and passing through the curved slots $k^3$ formed in the said plate, concentric with the stem D'.

$K^4$ is a bell-crank lever mounted upon a bracket $k^6$ upon the yoke K, said bell-crank lever being provided with a depending arm, which is connected with the locking plate K' by means of a pitman $K^4$. A depending rod $K^3$ is attached to the horizontal arm of the bell-crank lever and extends downward to a point within reach of the operator. By raising and lowering the rod $K^3$ the plate K' will be actuated through the medium of the bell crank lever and the said plate may be swung so as to bring its notches $k^5$ into alignment with the notches $k'$ of the yoke K. When the notches $k^5$ of the swinging plate are in alignment with the notches $k'$, the splines $d^8 d^8$ may pass freely through the same and the stem D' will be free to move relatively to the yoke. When, however, the yoke is located above the upper ends of said splines and the plate K' is rotated to carry the said notches $k^5$ out of alignment therewith, then the said plate will lock the yoke from downward movement relatively to the stem D', so that when the yoke is depressed, the stem will be carried downward with it, and the plunger D will be actuated. The detachable connection between the yoke K and the stem D' is intended to allow the said stem to be lifted with the outer parts B and C of the mold, at the time of taking the finished article from the latter. That is to say, when the compression of the article is completed and it is desired to remove from the machine the inner form carrying the molded article, the locking plate K' is turned so as to disconnect the stem D' from the yoke K, and the outer parts of the mold together with the stem D' and the plunger to which it is attached, may then be lifted vertically until above or free from the inner form.

To facilitate the lifting of the outer parts of the mold, a counterbalance weight is preferably employed to sustain the weight of the said parts, and other features of construction are provided as follows: The said parts B and C are held or guided in their vertical movement by means of the rods $J^5 J^5$ which are engaged by the outer margins of the flanges or ears $b' b' c', c'$, on the upper margin of the jacket B and the lower margin of the cylinder C respectively and other outwardly extending flanges or ears $b^4 b^4$ at the lower margin of said part B all of said flanges or ears being provided with notches fitting the rods in a manner clearly shown in Fig. 5.

In order to enable the power for lifting the parts B and C to be applied to the stem D', the cylinder C is provided at its upper part with inwardly projecting stops or lugs $c c$, which are adapted to engage the piston D when the latter is at the upward limit of its movement, and thereby prevent the piston being lifted further without carrying with it the said cylinder C and the jacket B attached thereto.

L is a counterbalance weight, to which is attached a rope L' passing over pulleys $l l'$ on the frame piece $I^2$ and attached to an arm $l^2$ upon a collar $L^2$ which is secured to the stem D' preferably at a point above the spherical enlargement $d^6$ thereof. The rope L' passes upwardly through a hole $k^6$ in the yoke K and through a corresponding hole $i$ in the frame piece $I^2$ to the pulleys $l l'$ which are mounted in an arm or bracket $l^2$ secured to said frame piece. It is obvious from the above that the counterbalance weight will tend to lift the stem D' and piston D and the latter being prevented by the stops $c c$ from rising above the upper end of the cylinder C, will act to lift said cylinder and the jacket B attached to the same. The counterbalance weight is made of such size as to counterbalance the weight of the said stem and all the parts connected therewith, including those attached to its upper end, hereinbefore described, so that when it is desired to lift said parts to remove the molded article, they may be easily moved by hand after having properly disengaged the tube from the yoke K by moving the locking plate K', as hereinbefore described. The counterbalance weight is shown as provided with a handle $L^3$ by which the parts may be conveniently moved.

In order to secure the perfect centering of the jacket B upon the top of the stationary cylinder F when the upper parts of the mold are lowered into position for operation, I provide upon one of said parts conical or tapered pins or plugs $b^5$ adapted to enter correspondingly shaped openings or sockets $f$ in the other part. In the particular construction shown the pins $b^5$ are inserted in the lugs or flanges $b^4$ $b^4$ at the lower margin of said jacket B, while the sockets or recesses $f$ are formed in the outwardly extended lugs or flanges $f'$ formed at the upper margin of the cylinder F.

In order to accurately support the upper part or end of the jacket B at the time the latter is lowered into its working position, rigid arms B' B' are attached to the opposite sides of said jacket and extend outwardly to points near the frame standards I' I' and in the outer ends of said arms are secured conical studs $b^6$ $b^6$ which are adapted to enter correspondingly shaped sockets $i'$ $i'$ formed in brackets $I^5$ $I^5$ attached to the said frame standards. The arms B' B' are herein shown as bolted to the jacket B and in order to avoid contact with the rods $J^5$ $J^5$ are forked at their inner ends to leave a space for the passage of said rods in the manner clearly shown in the drawings Fig. 5. It is obvious from the above described construction, that when the jacket B is lowered into its working position the studs $b^5$ $b^6$ by entering their respective sockets will accurately bring to place or center the said jacket, both at its upper and lower ends, and thus bring the said jacket exactly to its proper position and hold it in the same during the operation of molding the article.

Having described the means by which movement is given to the upper plunger D for compressing the pulp, as well as the devices by which said upper plunger and adjacent parts may be lifted independently of the actuating devices, for the removal of the finished article, the means illustrated for actuating the lower annular piston or plunger G will now be described. Before referring to the particular devices employed for this purpose, it may be desirable, in order to afford a clearer understanding of the operation of the parts referred to, to first state that motion is transmitted to said lower plunger from or through the medium of the vertically movable yoke K, which yoke is operated by the screw shaft J in the manner hereinbefore described. To now refer more particularly to the connections between the said yoke K and the annular plunger G, M, M, are two tubular rods or sleeves which surround and slide upon the frame standards I' I'. At their upper ends said sleeves M M are rigidly attached to the ends of the yoke K. At their lower ends said tubes M M terminate somewhat above the table I, and are connected by means of links $m$ $m$ with rocking levers N N which are pivotally supported between their ends from the table I by means of links N' N' pivotally connected with the said levers N N and with the table I in the manner illustrated. The ends of the levers N N opposite to those to which the links $m$ $m$ are attached are located adjacent to each other and near the central guide rod $I^3$, and upon said guide rod is mounted a sliding sleeve O, with which said levers N N have pivotal connection by means of lugs $o$ on the lower end of said sleeve, in the manner illustrated. The inner or adjacent ends of the said levers N N having no lateral movement but a vertical movement only, by reason of said connection with the sliding sleeve O, it is obviously necessary that the central pivots or fulcrums should be laterally movable, and the links N' N' above described are employed for this purpose.

Attached to the upper end of the sleeve O, somewhat above the levers N, but below the annular piston G, is located a yoke P, which is rigidly attached to the sleeve and provided with four outwardly extending or radial arms, two of which extend to and engage the rods $J^5$. The engagement of the said yoke P with the said rods is merely for the purpose of guiding the yoke in its vertical movement and preventing the same from being turned or rotated upon the rod $I^3$. The said yoke P is connected with the lower edge of the annular piston G by means of four links $p$ $p$, which are attached to the four arms of the said yoke P in the manner illustrated. The links $p$ are, for convenience in detaching the parts, pivotally connected with the piston G and the yoke, but this construction is obviously not essential.

From the construction described, it is obvious that when the cross head K is depressed to carry downward the upper plunger D, the outer ends of the levers N N will be correspondingly depressed and the inner ends of said levers lifted so as to carry upwardly the yoke P and the piston G connected with the same. The relative length of the arms of the levers N N inside and outside of their fulcrums is, of course, adjusted so as to give the desired extent of movement to the annular piston G. The construction described obviously affords simultaneous movement of the upper and lower plungers or pistons, so that the advantage is obtained of simultaneous compression of the pulp at the upper and lower ends of the mold with obvious advantages in obtaining equal distribution or density of the pulp within the mold.

Vertical motion has been heretofore described as being given to the cross head $J^4$ and rods $J^5$ for compressing the pulp, through the medium of the nut J' and screw shaft J. It is of course necessary to provide in connection with an actuating device of this character, some means for separating or giving a reverse movement to the plungers, and this may be accomplished either by reversing the direction of rotation of the screw shaft J, or by disconnecting the nut J' and screw shaft and lifting the cross head $J^4$ independently of the screw. I prefer to employ a device of this latter character in order that the plunger D and annular piston G may be quickly or rapidly retracted at the time of opening the mold. For this purpose I make the nut J' in two parts, $j$, $j'$ (Figs. 17 and 18), which are hinged together by means of interpenetrating loops $j^2$ $j^2$ $j^3$, which encircle the sleeve $J^3$ which is attached to said crosshead, and a suitable locking device is provided by which the two parts of the nut may be held together and in engagement with the screw shaft when power is being applied to operate the parts, but which may be actuated to release said parts of the nut when it is desired to detach the same from the said screw shaft. The locking device illustrated is more clearly shown in Figs. 17 and 18, and consists of a swinging lever $j^4$ which is pivoted between the free ends of the two links $j^5$ $j^5$, the opposite ends of which are pivoted to the part $j$ of the nut, and which pass through slots or openings in the other part. Said arm $j^4$ is provided, adjacent to the said links, with an inwardly extending cam arm $j^6$ adapted for engagement with a lug or projection $j^7$ on the part $j'$, and at its lower end with a horizontal arm $j^8$ adapted for engagement with a cone $j^6$ secured to the lower end of the screw shaft J. Said cone, in connection with the arm, serves as a means for automatically releasing the nut from the screw shaft at the completion of the pressing operation, the said cone being placed at such a point upon the shaft that when the plungers or pistons reach the extreme inward limit of their movement the arm $j^4$ will strike the conical surface and will be moved outward thereby a distance sufficient to release the cam arm $j^6$ from the lug $j^7$ and thus allow the separation of the parts of the nut. A coiled spring $j^9$ is placed between the parts of the nut to separate the same when the lever is actuated in the manner described.

When the screw shaft and nut are employed as a means of moving the cross head $J^4$ in one direction only, as described, suitable means may be used for lifting the said cross head so as to restore the parts to position for molding the next article, such as a spring or an equivalent counterbalance weight. In the construction shown, a coiled spring Q surrounds the guide rod $I^3$ below the sleeve $J^3$ and acts upwardly against the said sleeve so as to lift the cross head $J^4$ and connected parts and thereby depress the annular piston G. It is obviously unnecessary that the lifting of the cross head and yoke K by the action of the spring Q should also lift the piston D, for the reason that the said piston will be lifted by the action of the counterbalance weight, or the hand of the operator, or both, at the time the jacket B is raised for removing the molded article. The detachable connection described between the said yoke K and the stem D' is, therefore, not arranged to give a positive connection between these parts, but allows the cross head to rise by sliding upon the tube without lifting the latter or the plunger D which is attached thereto; the swinging plate K' at such time obviously being lifted above and carried away from the upper ends of the splines $d^8$ $d^8$. In fact, in the construction shown, the locking plate K' may be shifted so as to bring its notches in alignment with the said splines $d^8$ $d^8$ as soon as the compression of the pulp is accomplished and no further engagement of the cross head with the stem D' is necessary until after the said tube and connected parts have been lifted to allow the removal of the molded article and then restored to their operative position and the mold filled with pulp, after which the said plate K' is actuated preparatory to compressing a new charge of pulp.

As hereinbefore stated, the inner form A is detachably connected with the parts which support it, so that it may be removed together with the molded article resting thereon. Devices for detaching the said form and removing it to an adjacent pressing device are herein shown, it being understood that the pressing device itself is not herein shown, inasmuch as its construction and operation form no part of the present invention. The accompanying drawings, therefore, illustrate a device by which the form is supported while being transferred to a pressing device, which is properly constructed to receive the said form. The mechanisms last above referred to are constructed as follows: The upper end of the guide rod $I^3$ extends somewhat above the lower end of the central spindle $a^4$ of the form A, and in the lower end of said spindle is formed a socket $a^5$ (Fig. 9) adapted to receive the said upper end of the guide rod, which latter by its engagement with the socket serves to sustain the form accurately in its working position. Upon the lower end of the spindle $a^4$, below the lower disk $a^3$ thereon, is an annular flange or collar $a^6$, which, together with the lower surface of said disk $a^3$ forms an annular groove or recess.

R is a sleeve or collar mounted to slide vertically upon that portion of the guide rod $I^3$ immediately below its upper end, and adapted for contact with the annular flange $a^6$. Attached to said collar R are two depending links $r$ $r$, which at their lower ends are attached to the prongs of a forked foot-lever R', the outer end of which reaches to a point convenient for the foot of the operator. By pressing on the outer end of said foot lever, the sleeve R may be lifted on the rod $I^3$ and by acting against the under surface of the collar $a^6$ serves to lift the form A above or free from the upper end of said rod. In order to hold the form in position when thus lifted clear of the rod and prevent the same from being moved laterally, the sleeve R is preferably adapted to enter an annular recess or socket $a^7$ formed in the lower surface of the flange or collar $a^6$, in the manner clearly shown in the drawings, Fig. 9.

The guide rod $I^3$ is preferably made hollow or tubular to afford a passage for the escape of water from the interior of the form A, the spindle $a^4$ of said form being also made tubular and provided with holes or perforations to allow access of water to the upper open end of said rod $I^3$.

S indicates a swinging or oscillating carrier adapted to support and move laterally the form A when it is desired to shift the same from the molding apparatus to the pressing mechanism. Said carrier S consists of two main parts, to wit, a horizontal arm $S'$, which is mounted to swing horizontally about a post or support $S^3$, and a sliding bar $S^2$, which is arranged to move longitudinally upon the arm S and is provided at its free end with two prongs $s\ s$ made of proper size and shape to enter and engage the groove formed by and between the flange $a^6$ and the disk $a^3$. These parts are so constructed that when the outer jacket B is elevated and the form A lifted free from the rod $I^3$ by means of the foot lever, the said arm may be swung about its pivotal support until the bar $S^2$ is in alignment with the center of the form and the said bar $S^2$ may then be thrust outwardly until its forked end engages with the annular groove of the form. On releasing the foot lever the weight of the form will then be supported entirely by the forked end of the bar $S^2$, the sleeve R will have been released from engagement with the form, and the carrier as a whole may be swung about the standard $S^3$ so as to carry the form laterally away from the molding apparatus and deposit it upon a pressing apparatus properly located to receive it.

To refer more particularly to the details of construction illustrated in the form supporting and carrying device, the arm $S'$ is provided with a hub $s'$ which embraces the upper end of the post $S^3$ and which is provided at its lower end with a lug or stop $s^2$, engaging a radial pin $s^3$ on the post $S^3$ so as to limit the swinging movement of the carrier and stop the same when the forked end of the bar $S^2$ is in position to engage the form A. The said arm $S'$ is shown as provided with three radial handles $s^4\ s^4\ s^4$, by which the carrier may be conveniently moved or rotated upon the post $S^3$ and the bar $S^2$ is held upon the arm $S'$ by means of L-shaped clips $s^5\ s^5$. For giving endwise movement to said bar the latter is engaged at its inner end with an eccentrically pivoted plate $S^4$, herein shown as resting on a horizontally enlarged part of the arm $S'$, and as pivotally mounted upon the upper end of the post $S^3$ which extends above said arm. The engagement of the arm $S^2$ with said eccentric plate $S^4$ is effected by means of a groove $s^6$ in the marginal part of the plate, which groove is engaged by the down-turned end of an L-shaped plate $S^5$, which is pivoted to the inner end of said arm $S^2$ so that it may adjust itself to the angular position of the slot $s^6$ when the eccentric plate is turned, as clearly seen in Fig. 5.

The screw shaft J may be actuated in any suitable manner or by any suitable driving gear adapted to give rotary motion thereto, beveled gears $J^7$ and $J^8$ on the said screw shaft and on the countershaft $J^9$ being herein shown as employed for this purpose.

Having described the several features of the mechanism illustrated, the operation of the latter in the process of molding an article from pulp will now be stated. When the machine is ready for the delivery of the pulp to the mold, the parts will be in the position shown in Fig. 1, the plunger D at such time being lifted or elevated and the annular piston G at the lower limit of its movement. The nut $J'$ will be free from the screw shaft J, but the latter may be in continuous rotation if desired. Preparatory to filling the mold with pulp, a belt trained over the pulley $D^3$ at the top of the machine is started so as to give rapid rotary motion to the stem $D^2$ and the plate $d^2$ carried thereby. A proper quantity of pulp is then delivered into the hollow stem $D'$ through the supply tube $D^3$ and as it enters said stem $D'$ the plate $d^2$, then in rapid rotation, is depressed by pulling downwardly upon the rod $H^2$. Such depression of the plate forms an opening for the entrance of the pulp to the mold, and the pulp, as it is discharged from the stem $D'$ is, by the rapid rotation of the plate $d^2$, thrown outwardly as it strikes the same and falls into the outer portion of the mold, thereby filling the latter from its lower part upwardly and insuring the proper delivery of a sufficient quantity of the pulp to the narrow or conical parts of the mold. A quantity of pulp in its diluted state will usually be delivered sufficient to fill the mold to a point near or at the bottom of the plunger D. After the mold has been filled, the rod $H^2$ will be released, when the spring $D^4$ will lift the plate $d^2$ and thus close the lower end of the tube $D'$ against the exit of pulp. The outward movement of the pulp over the said plate $d^2$ is facilitated by the radial ribs on its top surface; which ribs, however, terminate at their outer edges inside of the outer margin of the said plate $d^2$, so that the said outer margin of the plate will fit closely against the under surface of the part $d'$ of the plunger, as hereinbefore stated, and thus form a tight joint adapted to prevent the escape of pulp when the plunger descends. The closing of the plate $d^2$ in the manner described will be facilitated by the upward pressure upon said plate produced by the compression of the pulp. After the mold has been filled in the manner described, the parts of the split nut $J'$ will be closed against the screw J and the said nut will then be carried downwardly by the screw, thereby drawing downward the cross head $J^4$, rods $J^5$ $J^5$ and yoke K, together with the stem D', which is caused to descend with the yoke by means of the locking plate K' which is moved into proper position to engage the splines $d^8$ $d^8$ before the machine is started. As the upper plunger is forced downward by the descent of the yoke K, the lower plunger or annular piston G will be raised by the upward movement of the yoke P accomplished through the intermediate mechanism hereinbefore described. The simultaneous movement of said plunger D and piston G will continue until both have reached the advance end of their stroke and the pulp is properly compressed within the mold. The escape of water from the central part of the mold is facilitated by the perforations $b$ $b$ at the middle part of the outer jacket B; but such perforations may not in all cases be necessary. As the pulp is delivered to the mold it will tend by gravity to descend into the lower part thereof between the cylinders E and F, and the apertures which are formed in said cylinders, as hereinbefore described, will, by allowing the rapid escape of water from the pulp, tend to facilitate the downward flow of the pulp from above and thus insure the deposition of a quantity of such pulp in the lower parts of the mold sufficient to secure the requisite density in the sides or conical walls of the vessel. The openings in the said cylinders E and F are, of course, closed by the plunger G as the latter rises, so that the discharge of water through the said openings only occurs during the introduction of the pulp into the mold and before the annular piston has been lifted. As the said annular piston rises the annular packing rings $g$ $g'$ act to prevent the escape of pulp at the sides of the piston, and when said rings reach the lower end of the jacket B the inner ring rests in position to form the inner beveled surface of the vessel, while the outer packing ring is forced inwardly by contact with the beveled surface $b^3$ and is thus caused to compress laterally as well as upwardly and to give continuous and perfect conical form to the outer surface of the vessel, notwithstanding the presence of the said beveled surface on the outer wall of the jacket of the mold. After the plungers have reached the limit of their movement, the nut J' becomes automatically disengaged from the screw shaft J, in the manner hereinbefore described, and the cross head $J^4$ is then lifted by the action of the spring J so as to throw upwardly the yoke K and depress the yoke P together with the lower annular piston G. The locking plate K' is then shifted to disconnect the stem D' from the yoke K and said stem, together with the piston D, cylinder C and jacket B is then lifted by hand, the counterbalance weight serving to enable this to be easily accomplished. After these parts have been lifted sufficiently to bring the lower margin of the jacket B considerably above the top of the form A, the foot is then placed upon the foot lever R' and the form A lifted clear of the rod $I^3$. For convenience in operating the carrier S, a hook or detent $R^2$ is preferably arranged to engage the foot lever R' when the latter is depressed, so that the form may be sustained in its elevated position without attention on the part of the operator. After the form has been elevated, the carrier S is swung into position for the engagement of the prongs $s$ $s$ with the form, the bar $S^2$ is then advanced until the said prongs rest beneath the form and the foot lever is then released and the sleeve R allowed to fall, thereby allowing the form to rest upon the said carrier S. The carrier is then rotated so as to carry the form laterally away from the machine and another form may be placed in position therein, the jacket B and connected parts lowered into position and the same operation before described then repeated for the production of another article.

Figures 16, 17, 18, 19, 20, 21:
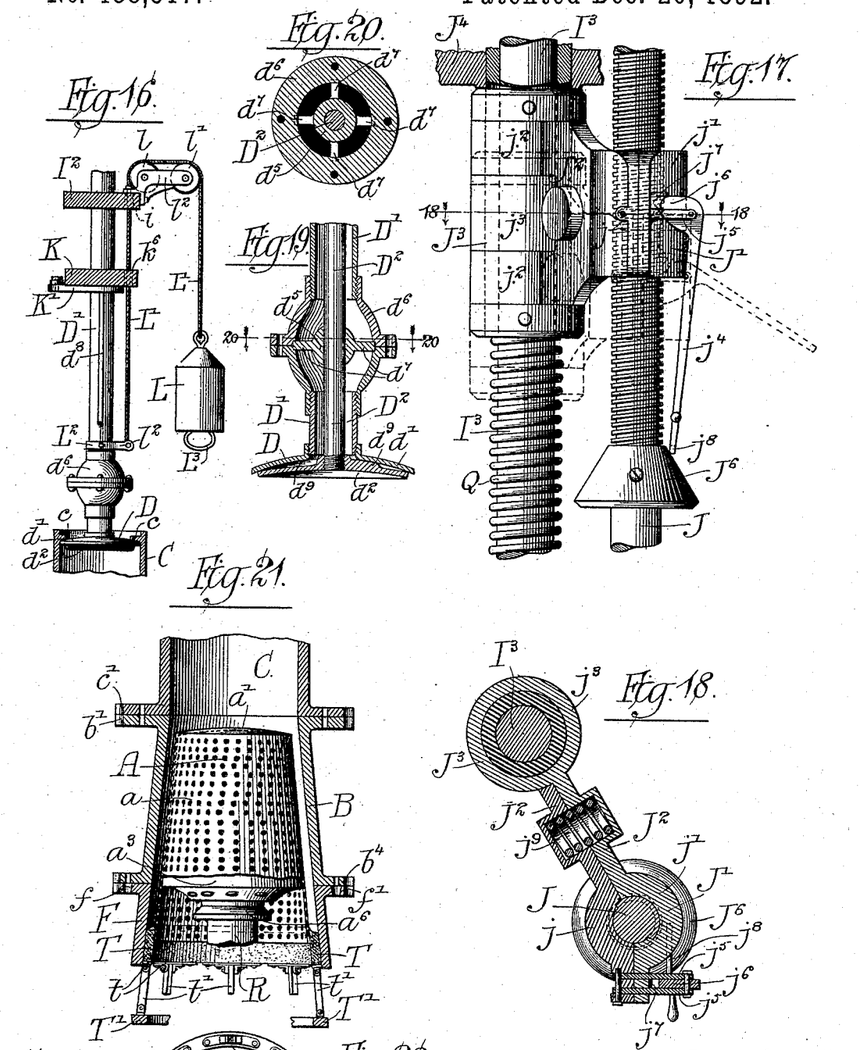
Fig. 16 is a detail vertical section of parts at the upper portion of Fig. 1, taken on line 16—16 of said figure.
Fig. 17 is an enlarged detail side elevation of parts shown at bottom of Fig. 1.
Fig. 18 is a detail plan section taken on line 18—18 of Fig. 17.
Fig. 19 is a detail section taken on line 19—19 of Fig. 1.
Fig. 20 is a detail horizontal section taken on line 20—20 of Fig. 19.
Fig. 21 is a sectional view of the mold showing a modified form thereof.
Figure 22:
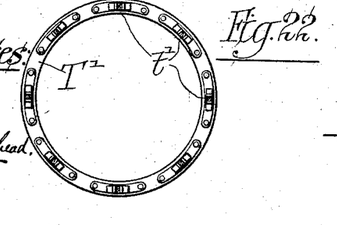
Fig. 22 is a view from beneath of the annular plunger shown in Fig. 21.

In Fig. 21 is shown a modified form of the mold wherein instead of employing the cylinders E and F to form an extension of the mold proper at the lower and larger part thereof, the conical inner and outer walls of the mold are themselves extended beyond the depth of the vessel to be molded and between such extended conical walls is located an annular piston T, which is made of rubber or other elastic material so that it may be compressed endwise and thereby reduced in circumference as it is forced upwardly or inwardly between the conical walls of the mold for the purpose of compressing the pulp within such conical part of the mold. For the purpose of actuating the annular piston T when thus constructed, a number of short segmental plates $t$ $t$ are secured to the lower edge of the elastic ring forming the piston, and to said plates are secured a plurality of links or bars $t'$ $t'$, which are attached to a suitable plate or yoke T', to which power is applied for moving the annular piston. A construction of this kind obviously produces the same general result obtained by that shown in the other figures of the drawings hereinbefore referred to, to wit, it provides for an extension of the mold in which is deposited a quantity of pulp which is forced into the mold proper in compressing the pulp. A construction of the kind last described has the advantage, however, of enabling vessels of different heights to be made by the use of the same mold, it being obvious that by changing the point to which the annular piston is advanced within the mold at the end of its throw, the conical walls of the vessel may be made wider or narrower to produce a deeper or shallower vessel.

I claim as my invention:

1. A mold for forming hollow articles of paper pulp consisting of an inner form, an outer form or jacket surrounding the same and open at both ends, a cylinder forming an extension of the outer form, a plunger sliding in said cylinder, inner and outer annular walls forming extensions of the inner and outer forms, and an annular piston sliding within the annular space formed by said walls, substantially as described.

2. A mold for forming hollow conical articles of paper pulp, consisting of an inner form having conical side walls and an end wall, an outer conical form or jacket surrounding the same, a cylinder forming an extension of the smaller part of the outer form or jacket, a plunger within said cylinder, inner and outer annular cylindric walls forming extensions of the conical inner and outer forms at the larger end thereof, and a cylindric annular piston sliding between said cylindric walls, substantially as described.

3. A mold for forming hollow articles of paper pulp, consisting of an inner form, an outer form or jacket surrounding the same, a cylinder forming an extension of the outer form or jacket, a plunger within said cylinder, inner and outer annular walls forming extensions of the inner and outer forms, and an annular piston sliding between said annular walls, the space between said annular walls being greater than that between the inner and outer forms, substantially as described.

4. A mold for making conical hollow vessels of paper pulp consisting of an inner form having conical side walls and an end wall, an outer conical form open at both ends, a cylinder forming an extension of the smaller end of the outer conical form, a plunger sliding in said cylinder, inner and outer cylinders forming extensions of the larger parts of the inner and outer conical forms, and an annular plunger sliding between said cylinders, said cylinders being stationary, and the outer form or jacket being movable toward and from the stationary outer cylinder, substantially as described.

5. A mold for making hollow conical articles of paper pulp consisting of an inner form having conical side walls and an end wall, an outer conical form open at both ends, a cylinder forming an extension of the smaller end of the outer conical form, a plunger sliding in said cylinder, inner and outer cylinders forming extensions of the larger parts of the inner and outer conical forms, and an annular plunger sliding between said cylinders, said cylinders being stationary, and the outer form or jacket being movable toward and from the stationary outer cylinder, and the inner form being detachably supported in position upon the inner cylinder, substantially as described.

6. A mold for forming hollow vessels from paper pulp, consisting of an inner form, an outer open ended form or jacket surrounding the same, a cylinder forming an extension of the said outer form or jacket, a plunger sliding in said cylinder, a hollow stem attached to said plunger and adapted for supplying pulp to the mold, said plunger having a movable inner part or plate the margin of which is adjacent to the margin of the plunger and which may be separated from the main part of the piston to allow the escape of pulp from the hollow stem to the interior of the mold, substantially as described.

7. A mold for forming conical vessels from paper pulp, consisting of an inner form, an outer open ended form or jacket, a cylinder forming an extension of said outer form or jacket, a piston sliding in said cylinder, a stem attached to said piston and adapted for supplying pulp to the mold, said piston having a movable inner part or plate which may be separated from the main part of the piston to allow the escape of pulp from the stem to the interior of the mold, said plate being mounted to rotate for the purpose of distributing the pulp within the mold, substantially as described.

8. A machine for molding conical articles from paper pulp, comprising an inner form, an outer open ended form or jacket, a cylinder forming an extension of the said outer form or jacket, a plunger sliding within the cylinder, inner and outer annular walls forming extensions of the inner and outer forms, an annular plunger sliding between said inner and outer annular walls, and mechanism for simultaneously actuating or moving said plunger and said annular piston, substantially as described.

9. The combination with an inner stationary form and an outer vertically movable form or jacket, of a cylinder forming an extension of the upper end of said jacket, a plunger sliding in said cylinder, a stem attached to the plunger, a reciprocating yoke for actuating the plunger, and means for detachably engaging the said stem with the said yoke whereby said stem may be disconnected from the yoke for lifting the plunger and outer parts of the mold free from the inner form, substantially as described.

10. The combination with the inner conical form and outer open ended conical form or jacket, a cylinder attached to the smaller end of the conical form or jacket, and a plunger sliding within the cylinder, said outer form or jacket being movable upwardly away from the inner form, and the said inner form being detachably supported, of a movable carrier adapted for engagement with the inner form, and means for lifting the inner form free from its support and into position to be engaged by the said carrier, substantially as described.

In testimony that I claim the foregoing as my invention I affix my signature in presence of two witnesses.

STANLEY L. CHAPMAN.

Witnesses:
C. CLARENCE POOLE,
GEO. W. HIGGINS, Jr.